United States Patent Office 2,802,984
Patented Aug. 13, 1957

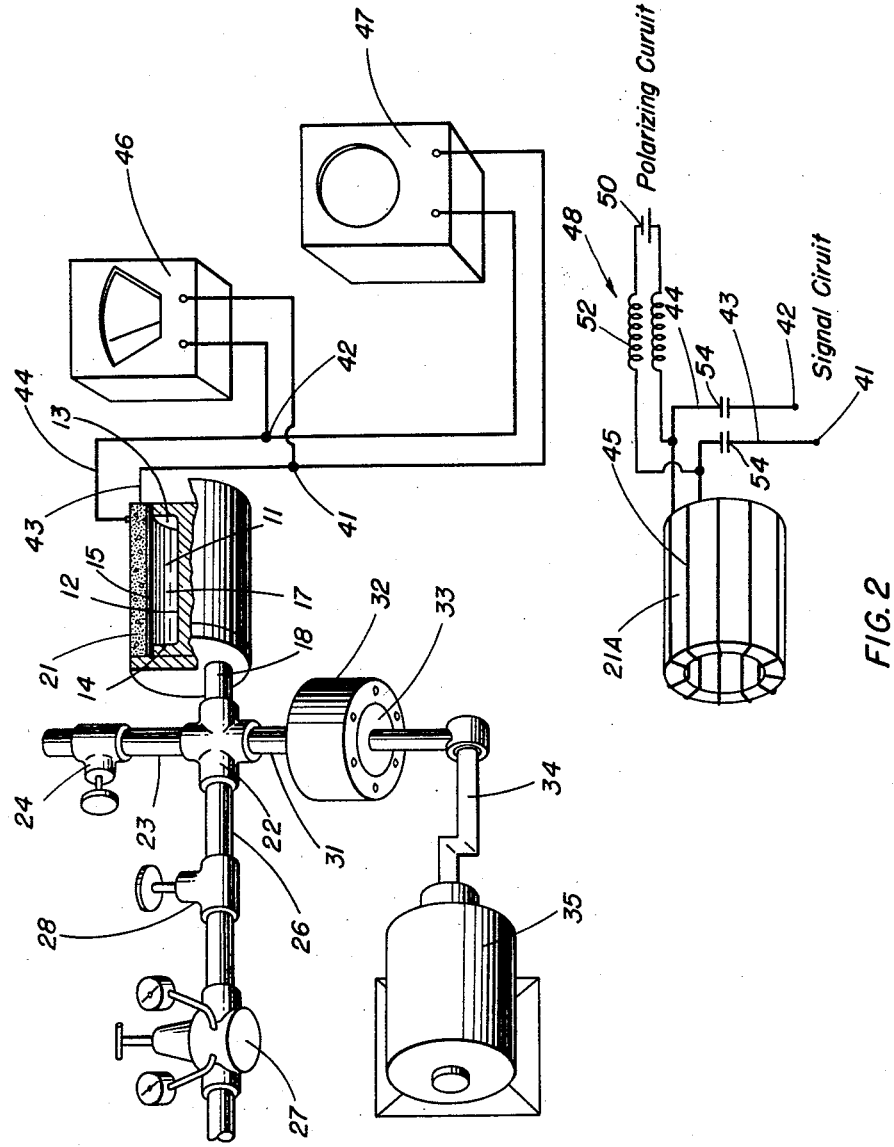

2,802,984

TESTING APPARATUS

Harry Sussman, Waterford, Conn., assignor to the United States of America as represented by the Secretary of the Navy Application March 19, 1953, Serial No. 343,535

11 Claims. (Cl. 324—56)

(Granted under Title 35, U. S. Code (1952), sec. 266)

The invention described herein may be manufactured and used by or for the Government of the United States of America for governmental purposes without the payment of any royalties thereon or therefor.

The present invention concerns a testing device and in particular concerns a device to test the sensitivity of piezoelectric and magnetostrictive cylinders. The device measures the electric voltage output of a test cylinder in response to a pulsating radial pressure at a frequency well below that of the fundamental mode of vibration of the cylinder. The device also tests for cracks in piezoelectric cylinders.

In the prior art one known method of testing the sensitivity of piezoelectric and magnetostrictive cylinders makes use of a static sensitivity testing device which involves the lifting of a weight from the sample under test. The static sensitivity device has the disadvantage that it measures the sensitivity of the cylinder to an axial rather than a radial stress. Although axial and radial stress are related it is established that the deduction of the relative radial response from the measured axial response is unreliable because of variations in the thickness of the cylinder walls.

Another method in the prior art of testing the sensitivity of piezoelectric and magnetostrictive cylinders is a pressure calibration method which employs a uniform alternating pressure generated in a test chamber into which the device to be tested is placed. This has the disadvantage that in order to test the radial mode by means of the pressure calibration method, each cylinder must be fitted with end caps so that this is a slow, tedious, and expensive method.

The present invention overcomes these disadvantages by providing a test device in which the cylinder to be tested is subjected to static air pressure forces and also to pulsating radial pressure. It provides a fast, economical, accurate, and valid method of testing the sensitivity of piezoelectric and magnetostrictive cylinders. It tests cylinders alone, not devices assembled into final form. Because cylinders, which are effectively part of the pressure test chamber, are very rigid in comparison to the air producing the pressure, variations in the thickness of the cylinder walls do not affect the pressure produced by the piston. It produces radial pressure and, hence, radial stress. While measuring the sensitivity of piezoelectric cylinders, it also detects cracks in them.

An object of the invention is to provide a testing device.

Another object is to provide a device for testing the sensitivity of piezoelectric and magnetostrictive cylinders.

Another object is to provide a device for measuring the electric voltage output of a cylinder of this type in response to pulsating radial pressure at a frequency well below that of the fundamental mode of vibration of the cylinder.

Another object is to provide a testing device that detects cracks in piezoelectric cylinders.

Another object is to provide a device for testing the sensitivity of piezoelectric and magnetostrictive cylinders by means of radial pressure applied from the interior of the cylinder being tested.

Another object is to provide a device for testing the sensitivity of such cylinders in which the cylinder under test is effectively part of the pressure chamber.

Another object is to provide a device for testing sensitivity of piezoelectric cylinders and also for detecting cracks in these cylinders by means of static pressure.

Other objects and many of the attendant advantages of this invention will be readily appreciated as the same becomes better understood by reference to the following detailed description when considered in connection with the accompanying drawings wherein:

Fig. 1 is a diagrammatic view of a preferred embodiment of the invention, and

Fig. 2 is a diagrammatic view of a magnetostrictive test cylinder having a toroidal winding thereon and a polarizing circuit connected thereto.

In the drawing there is shown a cylindrical test housing 11 comprising a central brass rod 12 and a pair of disc-shaped brass end caps 13, 14 formed integrally with brass rod 12 at the opposite ends thereof. A tubular rubber bladder 15 is fitted over cylindrical test housing 11 with the ends of tubular rubber bladder 15 sealed to the peripheries of brass end caps 13, 14. Rubber bladder 15 and brass end caps 13, 14 form internally a test chamber 17. An access pipe 18 opens through brass end cap 14 into chamber 17. Mounted on cylindrical test housing 11 is shown a test cylinder 21. The electric voltage output of cylinder 21 in response to a radial pressure is to be tested.

Access pipe 18 is connected to a multiple-arm coupling 22. Also connected to coupling 22 is a vent pipe 23 having a cutoff valve 24 and a static-pressure pipe 26 having a reducing valve 27. A cutoff valve 28 is connected in static-pressure pipe 26 between coupling 22 and reducing valve 27. Static-pressure pipe 26 at the end remote from coupling 22 is adapted for connection to a suitable source of static pressure.

A pulsating-pressure pipe 31 is connected at one end to coupling 22 and at the other end is connected to a cylinder 32 within which is mounted a piston 33. A crank 34 is provided for actuating piston 33. Crank 34 is connected to a motor 35.

There is shown a pair of binding posts 41, 42. Conductor means 43, 44 connect binding posts 41, 42 to the cylinder 21 to be tested. A high-impedance voltmeter 46 is connected across binding posts 41, 42 for indicating the output voltage of test cylinder 21. An oscilloscope 47 is also connected across binding posts 41, 42 to monitor the frequency and wave shape of the voltage output produced by alternating test pressure.

Operation of the device is as follows. In order to assemble a cylinder 21 to be tested upon housing 11 motor 35 is stopped, cutoff valve 28 is closed, and cutoff valve 24 is opened to vent the test chamber 17 with the result that bladder 15 is deflated. Test cylinder 21 is then slipped axially on to housing 11. Cutoff valve 24 is closed and cutoff valve 28 is opened to provide air at static pressure to test chamber 17. Reducing valve 27 is adjusted to approximately 6 lbs. per square inch or less. Motor 35 is then started to rotate crank 34 and cause reciprocation of piston 33 in cylinder 32. The volume change produced by piston 33 causes a relatively high pressure in test chamber 17, such high pressure being pulsating in nature and being exerted in a radial direction within test chamber 17 against the inner wall of test cylinder 21.

Initially when cylinder 21 to be tested is assembled upon housing 11 the static pressure of approximately 6 lbs. per square inch provided by opening cutoff valve 28 forces rubber bladder 15 firmly against the inner wall of the test cylinder 21. In the second stage of testing, reciprocation of piston 33 produces the pulsating radial pressure within test chamber 17 that is transmitted by rubber bladder 15 to the inner wall of test cylinder 21.

In testing piezoelectric cylinders the voltage generated by the radial pressure is carried by conductors 43, 44 that are connected respectively to the inside wall of test cylinder 21 and the outside wall of test cylinder 21 to the external detecting circuit comprising voltmeter 46 and oscilloscope 47. In the case of magnetostrictive test cylinder 21A (Fig. 2) voltage is generated in a toroidal winding 45 of a few turns. A source of flux is provided for the magnetostrictive cylinder. The source of flux may be a separate toroidal winding of wire around the cylinder 21A and carrying direct current, or a permanent magnet combined with the cylinder, or a direct current superimposed in the single winding on the varying current. These expedients are known in the art. In the drawing, the last-mentioned expedient is shown. A polarizing circuit 48 is connected to the winding 45 and includes a direct current source 50 in series with signal blocking inductive impedances 52. Capacitive impedances are included in conductors 43, 44 to block the polarizing current. The output voltage is registered on a high-impedance voltmeter 46 and at the same time it can be displayed on oscilloscope 47. Oscilloscope 47 can also be used to monitor the frequency and wave shape of the voltage output produced by the pulsating pressure.

In order to remove cylinder 21 from housing 11 after testing motor 35 is stopped, cutoff valve 28 is closed and cutoff valve 24 is opened to vent chamber 17. This causes bladder 15 to deflate whereupon, after disconnecting conductors 43, 44 it is possible axially to remove cylinder 21 from housing 11.

Modifications can be incorporated in the test device to provide automatic operation. In particular an automatic valve (not shown) can be installed to replace cutoff valves 24 and 28; with this change the device is capable of testing several hundred test cylinders per hour. The test device is constructed so that the volume change produced by piston 33 causes a relatively high pressure in test chamber 17 resulting in an average voltage output of ½ volt from a piezoelectric cylinder 21 under test. Conequently, shielding against noise pickup is no problem. In other units utilizing the same principle, however, isolation from electric and magnetic fields may be necessary.

Obviously many modifications and variations of the present invention are possible in the light of the above teachings. It is therefore to be understood that within the scope of the appended claims the invention may be practiced otherwise than as specifically described.

I claim:

1. A testing device comprising a test housing, said housing including rigid end caps and a tubular bladder sealed to said end caps, and a pressure system connected to said housing for selectively pressurizing the inside of said housing and venting said housing said system including means for providing a uniform alternating low pressure of controlled frequency and means for providing low static pressure.

2. A testing device comprising a cylindrical test housing, said cylindrical test housing including a central brass rod, a pair of disc-shaped brass end caps integral with said rod at opposite ends of said rod, a tubular rubber bladder sealed at its ends to the peripheries of said end caps, said rubber bladder and said brass end caps forming internally a test chamber, and an access pipe opening formed in and extending through one of said brass end caps into said chamber, an access pipe secured in the access pipe opening, said cylindrical test housing being adapted to have a pressure-sensitive test cylinder fitted over said bladder of said housing, a coupling connected to said access pipe, and a pressure system connected to said coupling for selectively pressurizing the inside of said housing and venting said housing said system including means for providing a uniform alternating low pressure of controlled frequency and means for providing low static pressure.

3. A test device comprising a test housing, said housing including rigid end caps and a tubular bladder sealed to said end caps, a vent system connected to said housing, and a pressure system connected to said housing for pressurizing the inside of said housing said system including means for providing a uniform alternating low pressure of controlled frequency and means for providing low static pressure.

4. A testing device comprising a cylindrical test housing, said cylindrical test housing including a central brass rod, a pair of disc-shaped brass end caps integral with said rod at opposite ends of said rod, a tubular rubber bladder sealed at its ends to the peripheries of said end caps, said rubber bladder and said brass end caps forming internally a test chamber, and an access pipe opening formed in and extending through one of said brass end caps into said chamber, an access pipe secured in the access pipe opening, said cylindrical test housing being adapted to have a pressure-sensitive test cylinder fitted over said bladder of said housing, a coupling connected to said access pipe, a vent system including a vent pipe connected to said coupling, a cutoff valve in said vent pipe, and a pressure system connected to said housing for pressurizing the inside of said housing said system including means for providing a uniform alternating low pressure of controlled frequency and means for providing low static pressure.

5. A testing device comprising a housing adapted to be placed inside a cylindrical test specimen to cause radial change therein, said housing including rigid end caps and a tubular bladder sealed to said end caps, a vent system connected with said housing, a pulsating-pressure system connected to said housing, and a detecting circuit adapted for connection to a test specimen to detect electric voltage output caused by radial change in the test specimen.

6. A testing device, said device comprising a cylindrical test housing adapted to be placed inside a cylindrical test specimen to cause radial change therein, said cylindrical test housing including a central brass rod, a pair of disc-shaped brass end caps integral with said rod at opposite ends of said rod, a tubular rubber bladder sealed at its ends to the peripheries of said end caps, said rubber bladder and said brass end caps forming internally a test chamber, an access pipe opening formed in and extending through one of said brass end caps into said chamber, an access pipe secured in the access pipe opening, said cylindrical test housing being adapted to have a pressure-sensitive test cylinder fitted over said bladder of said housing, a coupling connected to said access pipe, a vent system including a vent pipe connected to said coupling, a cutoff valve in said vent pipe, a pulsating-pressure system including a pulsating-pressure pipe connected to said coupling, a cylinder connected to said pulsating-pressure pipe, a piston in said cylinder for causing pressure to pulse in said cylinder, a crank for causing movement of said piston, said crank being adapted to be connected to a suitable source of power, and a detecting circuit to detect electric voltage output caused by radial change in the test specimen including a pair of binding posts, conductor means connecting said binding posts to the test cylinder, a voltmeter connected across said binding posts and an oscilloscope connected across said binding posts.

7. A testing device comprising a housing adapted to be placed inside a cylindrical test specimen to cause radial change therein, said housing including rigid end caps and a tubular bladder sealed to said end caps, a vent system connected to said housing, a static-pressure system connected to said housing, and a detecting circuit adapted for connection to a test specimen to detect electric voltage output caused by radial change in the test specimen.

8. A testing device comprising a cylindrical test housing adapted to be placed inside a cylindrical test specimen to cause radial change therein, said cylindrical test housing including a central brass rod, a pair of disc-shaped brass end caps integral with said rod at opposite ends of said rod, a tubular rubber bladder sealed at its ends to the peripheries of said end caps, said rubbed bladder and said brass end caps forming internally a test chamber, an access pipe opening formed in and extending through one of said brass end caps into said chamber, an access pipe secured in the access pipe opening, said cylindrical test housing being adapted to have a pressure-sensitive test cylinder fitted over said bladder of said housing, a coupling connected to said access pipe, a vent system including a vent pipe connected to said coupling, a cutoff valve in said vent pipe, a static-pressure system including a static-pressure pipe connected to said coupling, a reducing valve in said static-pressure pipe, a cutoff valve between said reducing valve and said coupling, said static-pressure pipe being adapted for connection to a suitable source of pressure, and a detecting circuit to detect electric voltage output caused by radial change in the test specimen including a pair of binding posts, conductor means connecting said binding posts to the test cylinder, a voltmeter connected across said binding posts, and an oscilloscope connected across said binding posts.

9. A testing device comprising a housing, said housing including rigid end caps and a tubular bladder sealed to said end caps, a vent system connected to said housing, and a pulsating-pressure system connected to said housing said system including means for providing a uniform alternating low pressure of controlled frequency and means for providing low static pressure.

10. A testing device comprising a housing adapted to be placed inside a cylindrical test specimen to cause radial change therein, said housing including rigid end caps and a tubular bladder sealed to said end caps, a vent system connected to said housing, a static-pressure system connected to said housing, a pulsating-pressure system connected to said housing, and a detecting circuit adapted for connection to a test specimen to detect electric voltage output caused by radial change in the test specimen.

11. A device for testing the sensitivity of pressure-sensitive cylinders, said device comprising a cylindrical test housing adapted to be placed inside a cylindrical test specimen to cause radial change therein, said cylindrical test housing including a central brass rod, a pair of disc-shaped brass end caps integral with said rod at opposite ends of said rod, a tubular rubber bladder sealed at its ends to the peripheries of said end caps, said rubber bladder and said brass end caps forming internally a test chamber, an access pipe opening formed in and extending through one of said brass end caps into said chamber, an access pipe secured in the access pipe opening, said cylindrical test housing being adapted to have a pressure-sensitive test cylinder fitted over said bladder of said housing, a coupling connected to said access pipe, a vent system including a vent pipe connected to said coupling, a cutoff valve in said vent pipe, a static-pressure system including a static-pressure pipe connected to said coupling, a reducing valve in said static-pressure pipe, a cutoff valve between said reducing valve and said coupling, said static-pressure pipe being adapted for connection to a suitable source of pressure, a pulsating-pressure system including a pulsating-pressure pipe connected to said coupling, a cylinder connected to said pulsating-pressure pipe, a piston in said cylinder for causing pressure to pulse in said cylinder, a crank for causing movement of said piston, said crank being adapted to be connected to a suitable source of power, and a detecting circuit to detect electric voltage output caused by radial change in the test specimen and including binding posts, conductor means adapted to connect said binding posts to a test cylinder, a voltmeter connected across said binding posts and an oscilloscope connected across said binding posts.

References Cited in the file of this patent

UNITED STATES PATENTS

| Number | Name | Date |
|---|---|---|
| 756,644 | Johnson | Apr. 5, 1904 |
| 1,506,418 | Evensta et al. | Aug. 26, 1924 |
| 1,956,403 | Scott | Apr. 24, 1934 |
| 2,312,888 | Everest | Mar. 2, 1943 |
| 2,511,178 | Roters | June 13, 1950 |
| 2,539,418 | Grogan | Jan. 30, 1951 |
| 2,578,031 | Aubrey et al. | Dec. 11, 1951 |
| 2,715,331 | Yates et al. | Aug. 16, 1955 |